United States Patent [19]
Sun

[11] Patent Number: 5,983,357
[45] Date of Patent: *Nov. 9, 1999

[54] COMPUTER POWER MANAGEMENT

[75] Inventor: Jiming Sun, Spring, Tex.

[73] Assignee: Compaq Computer Corporation, Houston, Tex.

[ * ] Notice: This patent issued on a continued prosecution application filed under 37 CFR 1.53(d), and is subject to the twenty year patent term provisions of 35 U.S.C. 154(a)(2).

[21] Appl. No.: 08/506,972

[22] Filed: Jul. 28, 1995

[51] Int. Cl.$^6$ ............................................. G06F 1/26
[52] U.S. Cl. .................................... 713/324; 713/320
[58] Field of Search ................... 395/750; 713/300–330

[56] References Cited

U.S. PATENT DOCUMENTS

| | | | |
|---|---|---|---|
| 3,941,989 | 3/1976 | McLaughlin et al. | 395/750 |
| 5,142,684 | 8/1992 | Perry et al. | 395/750 |
| 5,274,797 | 12/1993 | Barlow et al. | 395/750 |
| 5,339,445 | 8/1994 | Gasztonyi | 395/750 |
| 5,452,277 | 9/1995 | Borjorek et al. | 369/54 |
| 5,493,670 | 2/1996 | Douglis et al. | 395/750 |
| 5,560,022 | 9/1996 | Dunstan et al. | 395/750 |
| 5,590,061 | 12/1996 | Hollowell, II et al. | 395/750 |
| 5,594,672 | 1/1997 | Hicks | 364/707 |
| 5,625,826 | 4/1997 | Atkinson | 395/750 |
| 5,628,001 | 5/1997 | Cepueran | 395/556 |

*Primary Examiner*—Glenn A. Auve
*Assistant Examiner*—David A. Wiley
*Attorney, Agent, or Firm*—Sharp, Comfort & Merrett, PC

[57] ABSTRACT

Power is managed in a computer system that includes a power-using device. The power used by the device is regulated based on a measured rate of communications with the device.

31 Claims, 9 Drawing Sheets

| Indicator | Description |
|---|---|
| 0 | Not Accessed during the sampling period. |
| 1 | Infrequently used during the sampling period. |
| 2 | Frequently used during the sampling period. |
| 3 | Constantly used during the sampling period. |

FIG. 7

| Reader | Usage Count (C) | |
|---|---|---|
| 0 | $C=0$ | 450 |
| 1 | $0<C<5$ | 452 |
| 2 | $5 \leq C < 10$ | 454 |
| 3 | $10 \leq C$ | 456 |

FIG. 8

| Current Usage Reading | Current Indicator | Flag Checking | Next State | |
|---|---|---|---|---|
| 0 | Rarely Used (0) | Nothing | Rarely Used | ← 500 |
| | Infrequently Used (1) | Has the value decreased for 2 sampling periods? | Yes - Rarely Used<br>No - Infrequently Used | |
| | Frequently Used (2) | Nothing | Infrequently Used | |
| | Constantly Used (3) | Nothing | Infrequently Used | |
| 1 | Rarely Used (0) | Has the value increased for 2 sampling periods? | Yes - Infrequently Used<br>No - Rarely Used | ← 504<br>← 502 |
| | Infrequently Used (1) | Nothing | Infrequently Used | |
| | Frequently Used (2) | Has the value decreased for 2 sampling periods? | Yes - Infrequently Used<br>No - Rarely Used | |
| | Constantly Used (3) | Nothing | Frequently Used | |
| 2 | Rarely Used (0) | Nothing | Infrequently Used | |
| | Infrequently Used (1) | Has the value increased for 2 sampling periods? | Yes - frequently Used<br>No - Infrequently Used | |
| | Frequently Used (2) | Nothing | Frequently Used | |
| | Constantly Used (3) | Has the value decreased for 2 sampling periods? | Yes - Frequently Used<br>No - Constantly Used | |
| 3 | Rarely Used (0) | Nothing | Infrequently Used | |
| | Infrequently Used (1) | Nothing | Frequently Used | ← 506 |
| | Frequently Used (2) | Has the value increased for 2 sampling periods? | Yes - Const. Used<br>No - Freq. Used | |
| | Constantly Used (3) | Nothing | Constantly Used | |

FIG. 9

| Current State | Action |
|---|---|
| Rarely Used | Spin down. |
| Infrequently Used | Set up the spin-down timer to be 3 minutes (number subject to change). |
| Frequently Used | Set up the spin-down timer to be 6 minutes (number subject to change). |
| Constantly Used | Clear the spin-down timer |

*FIG. 10*

| Device | Usage Pattern | Power Management Action |
|---|---|---|
| CPU | Typing uses very little CPU power. | CPU Usage Indicator gradually drops to level 0, and auto-halt or stop-clock will kick in between interrupts. |
| Disk | Infrequently saves document to disk. | Disk Usage Indicator will reach and stay at level 1, a relatively short spin-down time-out is set up at this level. |
| Keyboard | Keyboard is used very frequently. | Keyboard Usage Indicator will reach and stay at level 3 that keeps keyboard full on all the time. |
| Display | Screen updates very often, but not as dramatic as graphic programs requires. | Display Usage Indicator will reach and stay at level 2, the backlight may be dimmed to a certain level over time. |

*FIG. 11*

| Device | Usage Pattern | Power Management Action | |
|---|---|---|---|
| CPU | Calculation requires a lot of CPU power. | CPU Usage Indicator will reach and stay at level 3, full speed is used. | ─800 |
| Disk | Frequently saves document to disk. | Disk Usage Indicator will reach and stay at level 2, a relatively long time-out is set up. | ─802 |
| Keyboard | Keyboard is used frequently. | Keyboard Usage Indicator will reach and stay at level 2, a long idle time-out is set up. | ─804 |
| Display | Screen updates very often, but not as dramatic as graphic programs requires. | Display Usage Indicator will reach and stay at level 1, the backlight may be dimmed to a certain level over time. | ─806 |

*FIG. 12*

COMPUTER POWER MANAGEMENT

BACKGROUND

This invention relates to managing power in a computer.

Computer systems typically conserve power by shutting off system devices (e.g., a hard drive, a monitor) when they are idle. A timer associated with each component is reset each time the device is activated. When the timer expires, the device is automatically powered down. Examples include display monitors which are configured to dim after remaining idle for a preset period of time.

Other parameters that affect power consumption include the processing speed of computers and the spin time of disk drives in the system.

In some systems, a user can reconfigure the timer and other power characteristics of a device using specially designed configuration software.

SUMMARY

In general, in one aspect, the invention features managing power in a computer system that includes a power-using device. The time rate of communications with the device is monitored, and the power used by the device is regulated based on the monitored rate.

Preferred embodiments of the invention include the following features.

The time rate of communications is monitored periodically. A state indicator is assigned to the device based on the rate, and the power usage parameters of the device are updated based on the indicator. A time rate of communications that occur with a second power-using device in the computer is monitored, and the power used by the second device is regulated based on its time rate of communications.

In general, in another aspect, the invention features a computer program that includes instructions for monitoring communications and regulating power use in the manner described above.

Preferred embodiments of the invention include the features described above. In addition, the program is implemented as firmware in the computer.

In general, in another aspect, the invention features a counter connected to count communications that occur with a power-using device in the computer. A regulator is connected to regulate the power used by the device based on the contents of the counter.

Preferred embodiments of the invention include the following features.

A range register coupled to the counter indicates a range of ports associated with the device to the counter. The counter counts communications with the device by monitoring signals exchanged over the ports. The regulator periodically reads the counter. A second counter counts communications with a second power-using device and the regulator regulates power use by the second device based on the contents of its corresponding counter.

In general, in another aspect, the invention features a computer system having a power-using device coupled by a communication line to a main processor. A circuit is connected to monitor the time rate of communications that occur between the main processor and the power-using device, and a regulator is connected to regulate power use by the device based on the time rate of communications.

Preferred embodiments of the invention include the features described above. In addition, the regulator regulates power use by executing firmware stored in a memory. A timer is connected to periodically activate the regulator.

Among the advantages of the invention are the following.

The power management system automatically yields lower power usage for the computer without requiring the user to invoke power configuration software. The system thus optimizes power usage without requiring the user to understand the various tradeoffs between power saving and performance for each device in the system.

The system continually adapts the computer's power distribution to the current usage pattern. This prevents devices in active use from being powered down and causing disruptive delays for the user. At the same time, the system conserves energy by reducing power to idle devices. Power is thus distributed efficiently without sacrificing the computer's response time and processing speed. The user is thus freed from manually reconfiguring the system each time he changes his usage pattern.

The system manages power transparently to the user, i.e., the user is unaware of power management activities other than the latency involved in waking up a device that has been automatically powered down.

Other features and advantages will become apparent from what follows.

DESCRIPTION

Figure 1:
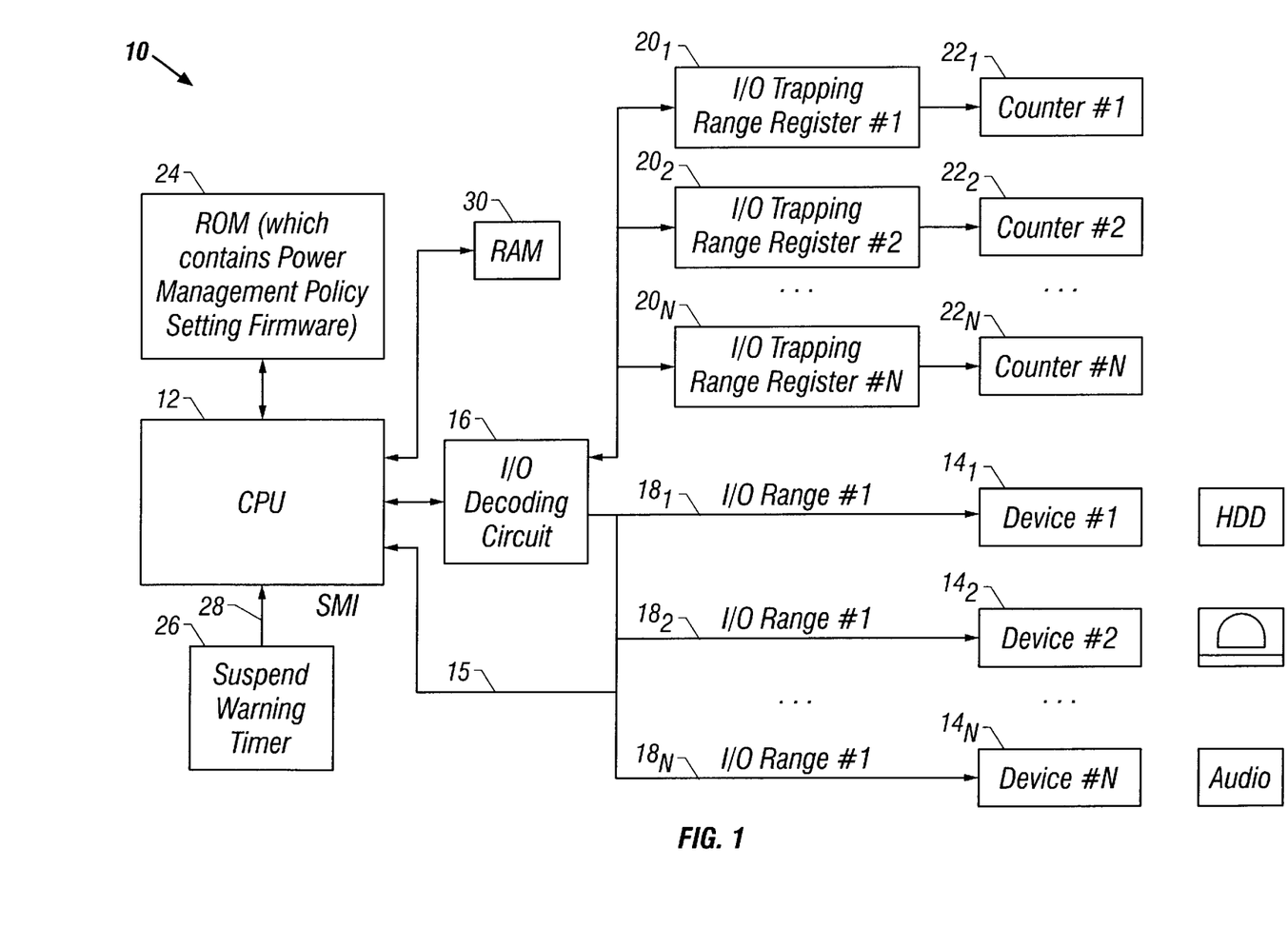
FIG. 1 is a schematic diagram of a computer system that performs dynamic power management.

Referring to FIG. 1, a computer system 10 includes a central processing unit (CPU) 12 (e.g., the main microprocessor of a personal computer) connected to a variety of devices $14_1, \ldots, 14_N$ by a data bus 15 and an input/output decoding circuit 16. Each device is connected to the input/output decoding circuit and the data bus by a specified range of input/output ports $18_1, \ldots, 18_N$. The devices include a hard disk drive (HDD), a floppy disk drive (FDD), a display monitor, a keyboard and mouse, an infrared communication device, a modem card, a network chip, an audio chip, and other devices that can be monitored at their input/output ports.

When communicating with a device, the CPU sends data signals on the data bus and an address signal specifying the I/O ports of the device to the decoding circuit. The decoding circuit interprets the address signal and produces a "CHIP_SELECT" signal that causes the data to be received at the I/O ports of the device specified by the CPU.

The devices communicate with the CPU by sending signals over the data bus. Because there is only one CPU connected to the bus, an I/O decoding circuit is not required for these signals.

Input/output trapping range registers $20_1, \ldots, 20_N$ each connect a single counter $22_1, \ldots, 22_N$ to the input/output decoding circuit. The range registers are available in power management chip sets marketed by Opti, Pico Power and VLSI, among other vendors.

Each counter is configured to monitor a range of ports specified by its corresponding range register. For example, if counter $22_1$ is assigned by range register $20_1$ to track the eight input/output ports connected to the hard disk drive $14_1$, counter $22_1$ is incremented by eight each time the disk drive is accessed by decoding circuit 16.

The CPU is connected to a standard read-only memory (ROM) 24 which contains power management firmware (i.e., low-level software or the basic input/output system). A suspend warning timer 26 periodically supplies a system management interrupt (SMI) signal 28 to the CPU. The CPU stores information used in executing the firmware in a random access memory (RAM) 30.

Figure 2:
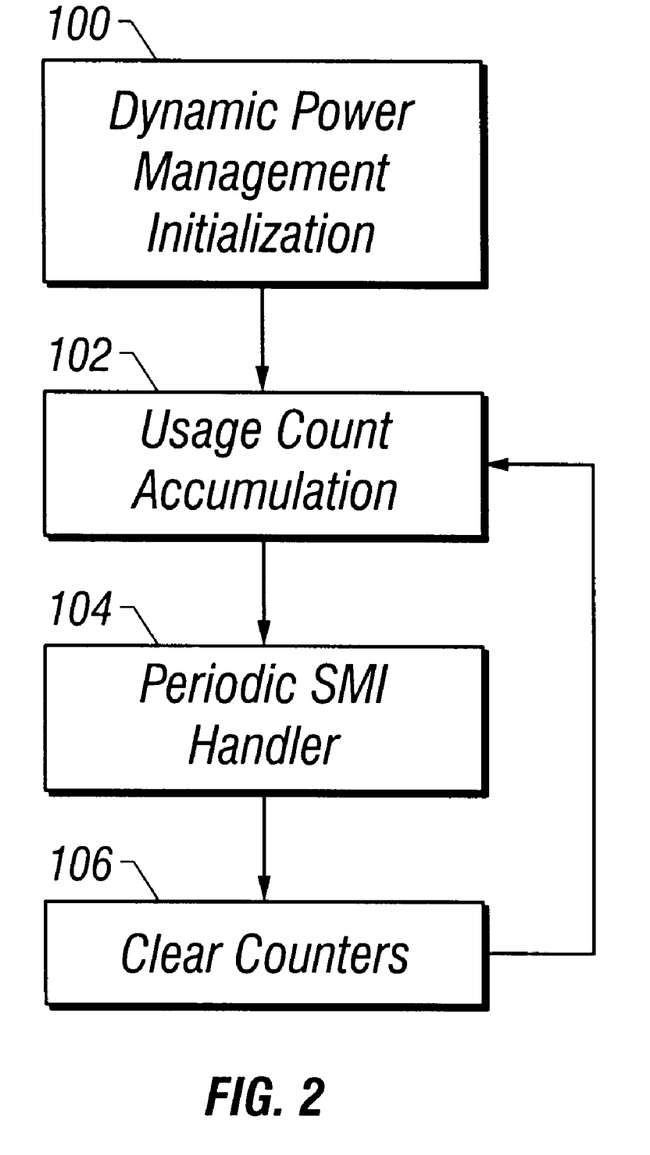
FIG. 2 is a block diagram showing operations performed by the system of FIG. 1.
Figure 3:
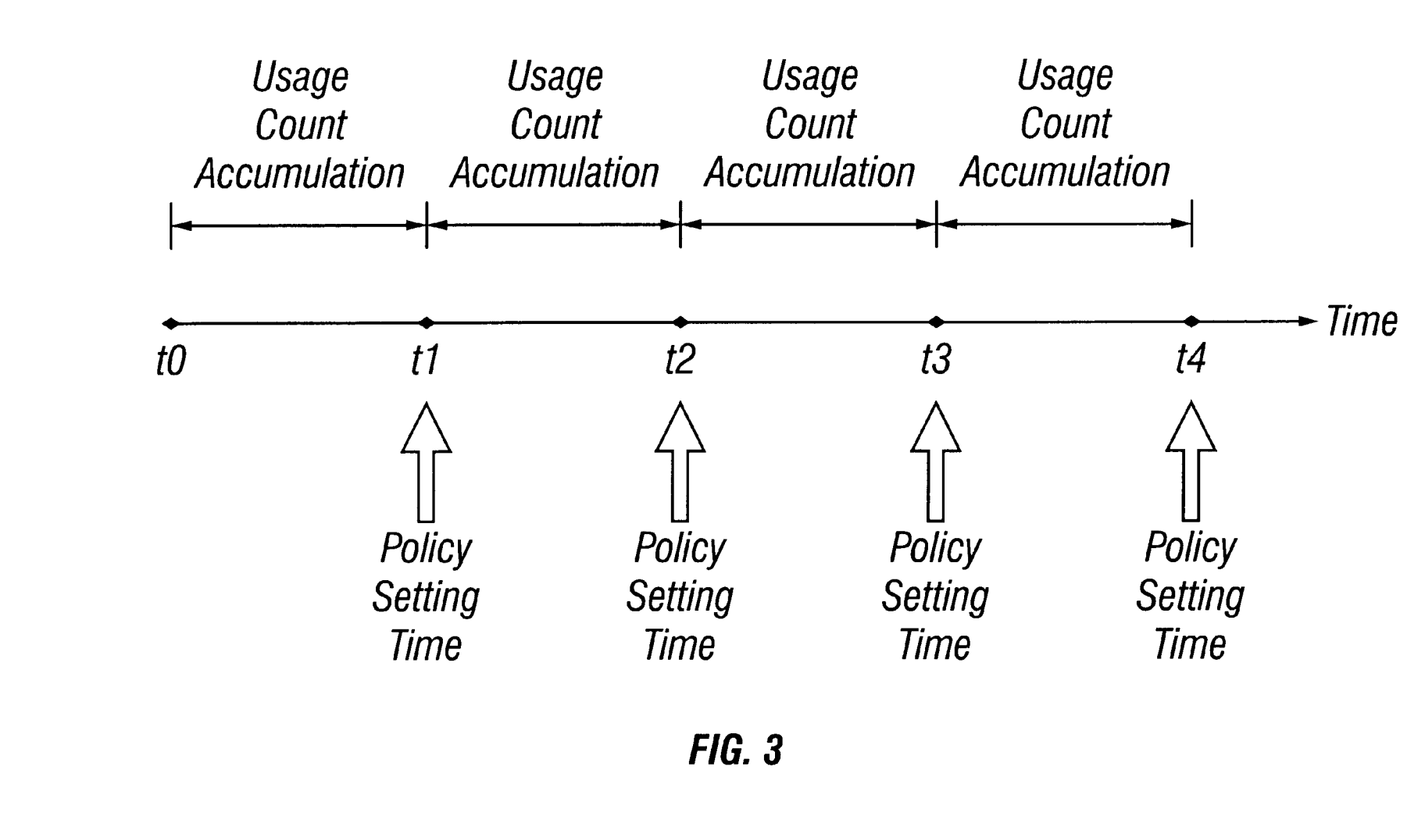
FIG. 3 is a timing diagram for the system of FIG. 1.

Referring to FIGS. 2 and 3, prior to time $t_0$, the CPU initializes the counters $22_1, \ldots, 22_N$, the timer 26, and the range registers $20_1, \ldots, 20_N$ (step 100). At time $t_0$, the counters begin to accumulate the number of times each input/output port is accessed (step 102). The contents of the counters thus give an indication of how many times each device has been used in a given period of time, i.e., the rate of usage.

After a given sampling period, e.g., five minutes, the timer is activated and sends the CPU an SMI signal (at policy setting time $t_1$). This causes the CPU to execute the periodic SMI handler firmware (step 104). During this process, the CPU updates the power management parameters of each device in the system based on the contents of the counters. Depending on the device, the parameters are either stored in the device itself (e.g., the time-out period for the hard disk drive is stored directly in the drive), or are recorded by the CPU in a table in the RAM (e.g., the timeout period for the audio chip). After the firmware execution is complete, the counters are cleared (step 106). The counters then accumulate until the next policy setting time ($t_2$). The process repeats as long as the system is in use.

Figure 4:
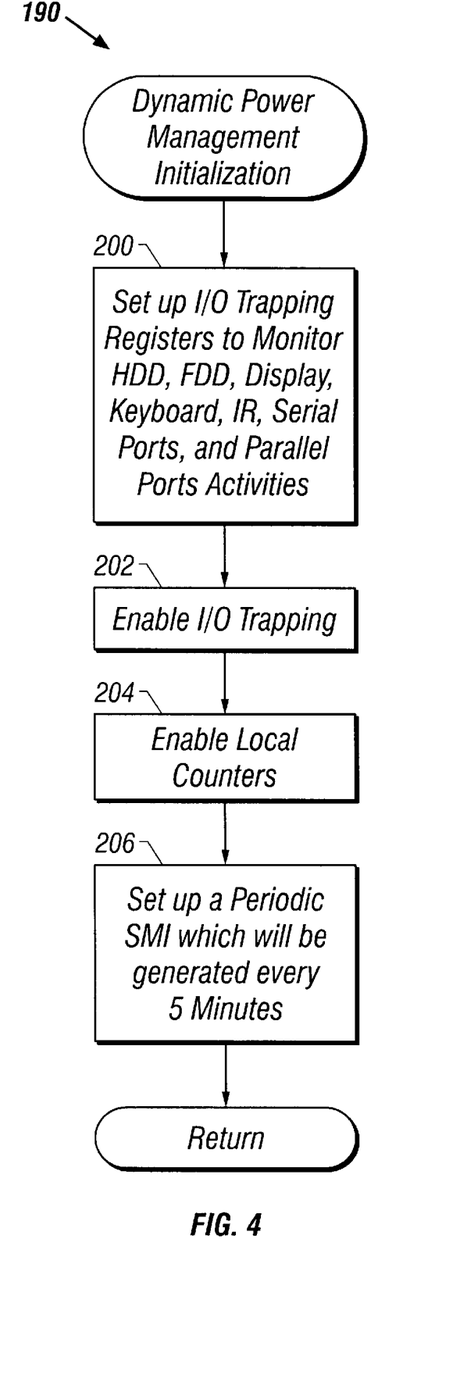
FIGS. 4 and 5 are block diagrams showing in more detail the operations of FIG. 2.

During initialization (step 100), as shown in FIG. 4, the CPU assigns to each range register a set of input/output ports corresponding to a device (step 200). The range of I/O ports assigned by the CPU is stored in the appropriate range register. For example, the ports $18_N$ of device $14_N$ are assigned to range register $20_N$, so that counter $22_N$ tracks the number of accesses made to the ports $18_N$. Each device to be managed is tracked by at least one range register. After the range registers are configured, the CPU enables the range registers and their associated counters (steps 202, 204). The CPU then configures the timer to generate an SMI signal every five minutes (step 206).

Figure 5:
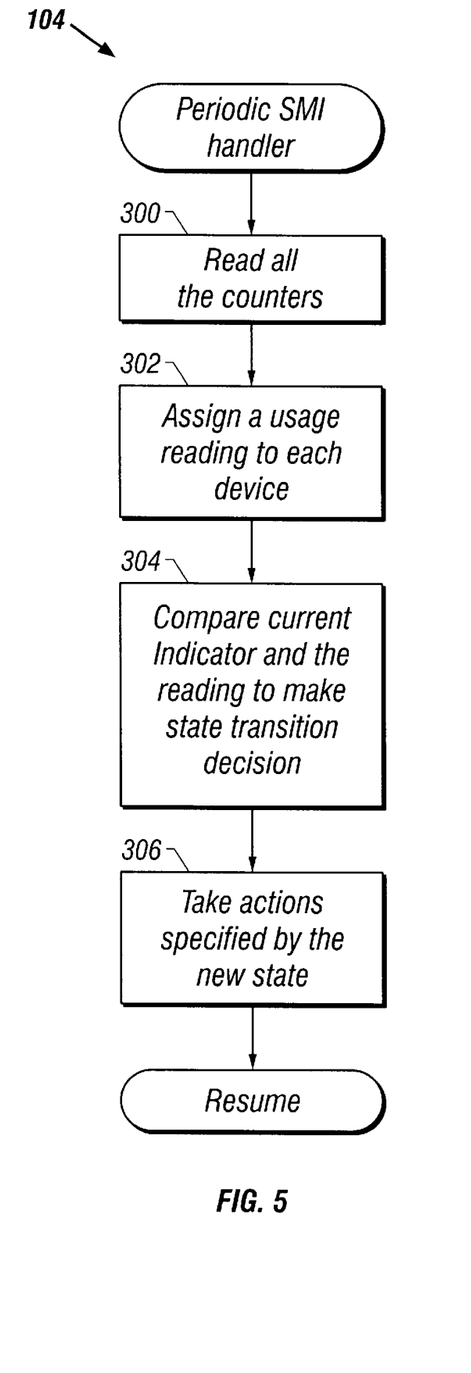

Referring to FIG. 5, each time the CPU receives an SMI signal from the timer, it invokes the SMI handler operations (step 104) encoded in the firmware. During this process, the CPU first reads all the counters (step 300) and, based on the contents of the counters, assigns a usage reading to each device (step 302). Next, the CPU compares the reading to an indicator stored in memory 30 representing the rate of use of the device in a previous sample period. Based on this comparison, the CPU decides whether the device has entered a state of either higher or lower usage (step 304). If the device has changed state, the CPU adapts the device's power management parameters (stored either in memory 30 or in the device itself) to the device's new state (step 306). If the state has not changed, the CPU does not adjust the device's power parameters.

Figure 6:
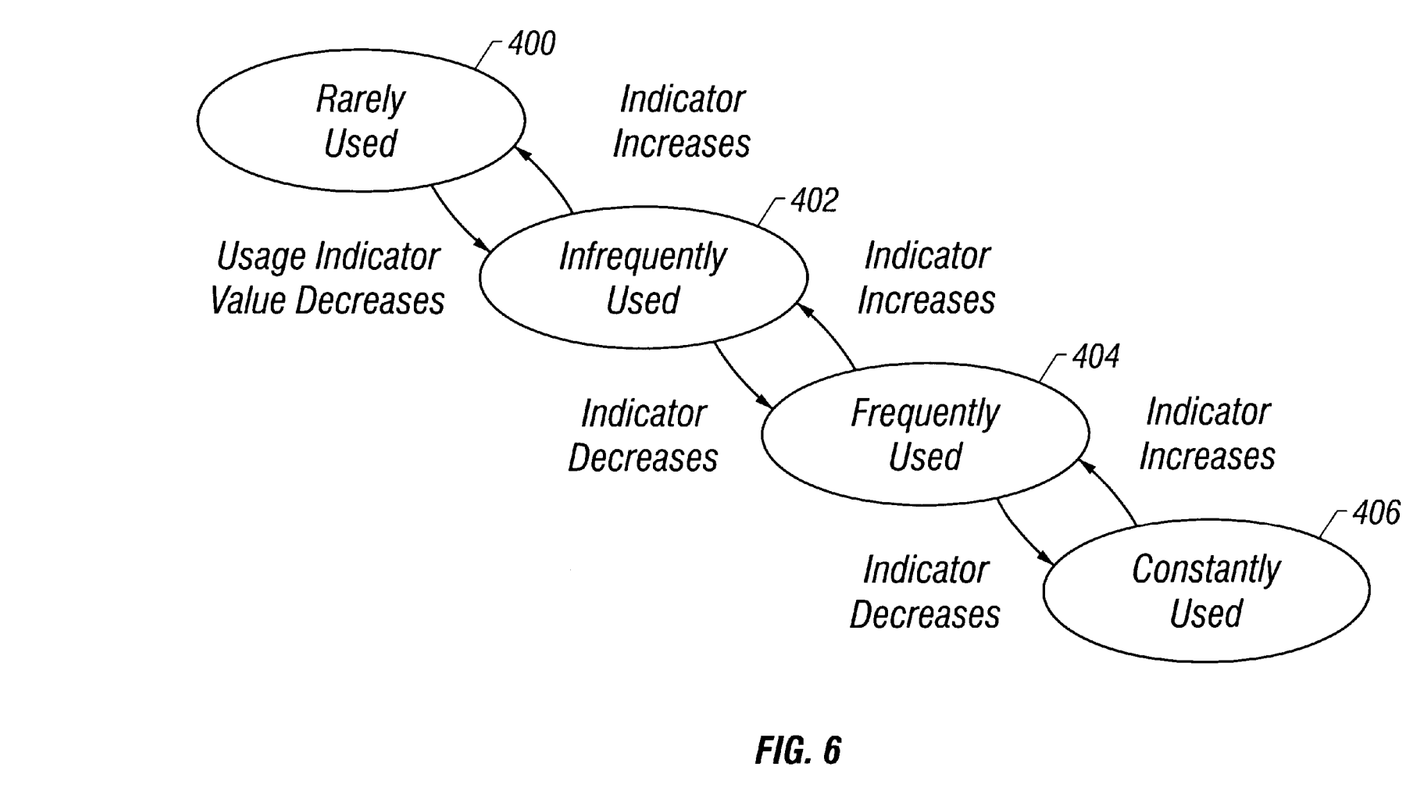
FIG. 6 is a state diagram for devices in the system of FIG. 1.

As seen in FIG. 6, each device can be in one of four usage states. If the device is generally idle, it is in a "rarely used state" 400. Devices used more often may be in an "infrequently used" state 402 or a "frequently used" state 404. Devices that are used continually are in a "constantly used" state 406.

Figure 7:
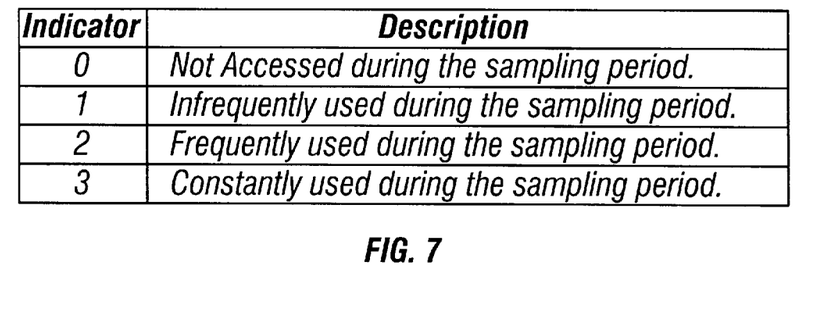
FIG. 7 is a table of the states shown in FIG. 6.

The CPU tracks the state of each device in the system by storing a usage indicator for each device in memory 30, in the form of a table. As shown in FIG. 7, indicators 3, 2, 1 and 0 represent the constantly used, infrequently used, frequently used and rarely used states, respectively.

Figure 8:
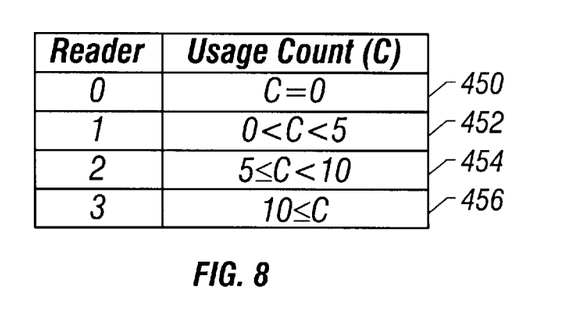
FIG. 8 is a table associating contents of counters in FIG. 1 with a usage reading.

Each time the CPU reads the counter associated with a device (step 300 in FIG. 5), the CPU assigns a usage reading to the device based on a usage count accumulated in the counter. The readings generally correspond to the indicators of FIG. 7. As shown in FIG. 8, if the usage count for the device is 0, the CPU assigns a usage reading of 0 to the device (row 450). If the usage count is between 1 and 4, the CPU associates a reading of 1 with the device (row 452), but if the count is between 5 and 9, the CPU assigns a reading of 2 (row 454). Last, if the count exceeds 9, the CPU assigns a reading of 3 to the device (row 456).

After assigning a reading to each device, the CPU compares the reading to the stored indicator for the device (step 304 in FIG. 5). The CPU adjusts the indicator only if the usage reading differs by two levels from the indicator, or if the usage reading has differed by one level from the indicator over two consecutive sampling periods. When either of these criteria is met, the CPU adjusts the indicator for the device by one. As a result, a device's indicator does not change by more than one within a sampling period, even if the device jumps from being rarely used to being constantly used. This scheme averages out the effects of unusual activities and prevents the system from undergoing abrupt changes in power.

Figure 9:
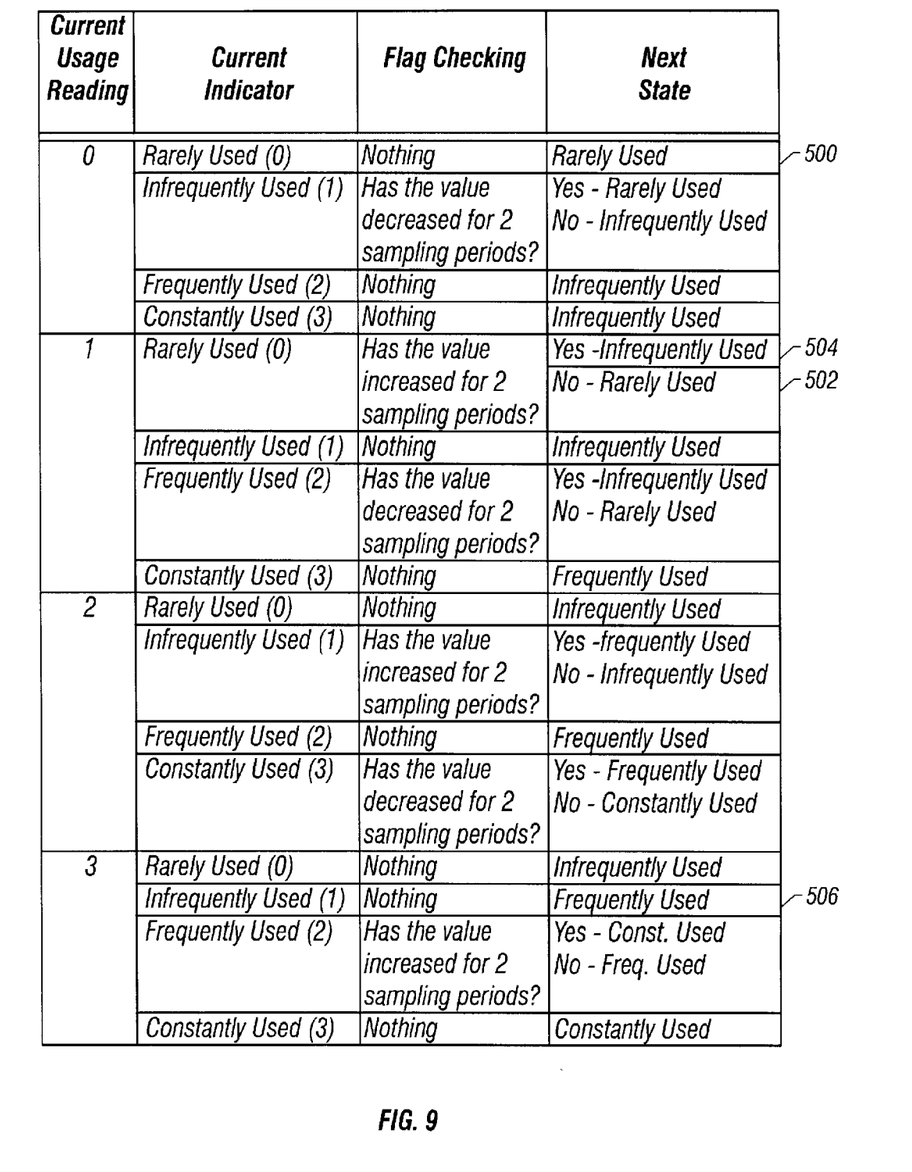
FIG. 9 is a decision table for the system of FIG. 1.

The CPU employs the decision table of FIG. 9 in deciding whether to change the indicator of a device to show a state transition (step 304 in FIG. 5). For example, if the CPU has recorded the current state of the device as "rarely used" (i.e., indicator=0), and in a subsequent sampling period discovers the current usage reading remains zero (row 500), the CPU does not change the indicator associated with the device. In the next sampling period, if the usage count increases so that the current usage reading is 1, the CPU determines whether the reading has exceeded the indicator by one for two consecutive sampling periods (row 502). Because the reading has been one for only a single sampling period, the CPU keeps the indicator for the device at zero. As a result, no state change occurs, and the CPU does not alter the power management parameters for the device.

If, in the next period, the CPU again determines that the usage reading for the device is 1, the CPU determines that the reading has exceeded the indicator for two consecutive periods, and the indicator for the device is updated to one (row 504). The device has thus undergone a state change, and the CPU will update its power management parameters accordingly (step 306 in FIG. 5).

If, in a subsequent sampling period, the CPU determines that the device's usage reading has risen to 3, the CPU will immediately update the device's indicator from 1 to 2, and the device will enter the frequently used state (row 506). This is because the device's usage reading has exceeded its indicator by two in a single period.

In the next period, if the CPU finds that the usage count corresponds to a usage reading of 1, the CPU will not update the device's indicator. This is because the device's reading has differed from its indicator by one for only a single sampling period.

Each time a device's indicator changes to indicate a state transition, the CPU updates the power management parameters of the device (step 306 in FIG. 5). Generally, when a device changes from a lower state to a higher state, the CPU will reconfigure the device to have a faster response time and to provide for less power saving. When a device jumps from a higher state to a lower state, the CPU will adjust the parameters of the device to provide for a slower response time and more power saving.

Figure 10:
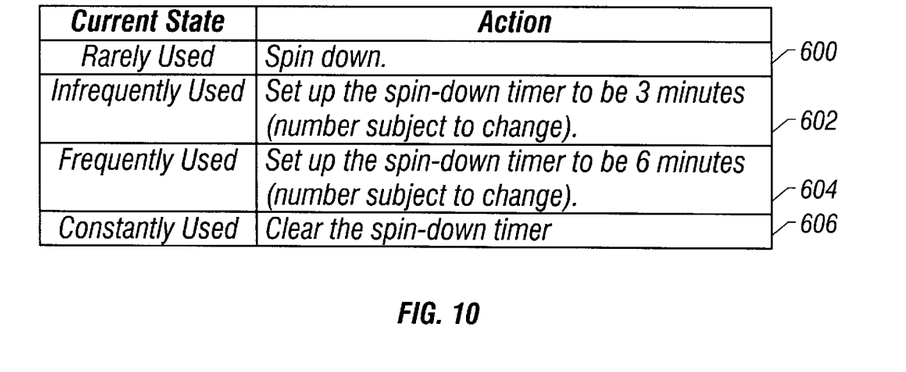
FIG. 10 is an action table for the system of FIG. 1.

For example, as shown in FIG. 10, a hard disk drive has four settings corresponding to each state. If the hard disk drive enters the rarely used state, the CPU will spin down the drive (row 600). The CPU can then allocate the power from the unused drive to other devices. When the drive enters the infrequently used state, the CPU will set the drive's automatic spin down period to a relatively short time, e.g., three minutes (row 602). If the drive subsequently enters the frequently used state, the CPU will increase the spin down time to, for example, six minutes (row 604). Next, if the drive enters the constantly used state, the CPU will clear the spin down timer, and the device will not shut off for as long as it remains in that state (row 606). If the drive subsequently returns to the frequently used state, the CPU will reduce the spin down time to six minutes.

Although the CPU itself cannot be monitored by an input/output trapping range register, the frequency of use of the CPU can be tracked through the CPU's operating system. Operating systems typically have an idle detection routine which is automatically invoked when there are no system activities. The frequency of idle signals on the CPU can be tracked by the firmware in the ROM, and a usage reading assigned to the CPU based on the frequency. A low reading is assigned to the CPU when the frequency of idle calls is high. A usage indicator for the CPU is updated based on the current reading, in the manner described above. The firmware then manages the power supplied to the CPU by adjusting the CPU clock frequency. For example, less power is provided to the CPU by reducing its clock frequency. For minimum power, the firmware stops the clock and the CPU is powered down until an interrupt is received.

By monitoring and assigning power to each device, the CPU can efficiently allocate power throughout the system. For example, referring to FIG. 11, when a user is working on a word processor, the disk drive is used occasionally, e.g., each time the user saves his document to a disk. As a result, the disk usage indicator will reach and stay at the infrequently used state, and the disk will be configured with a three minute spin down time (row 700). Because the user is continually using the keyboard, however, the keyboard will reach and stay at the constantly used state, and the keyboard will be configured to remain fully on (row 702).

Figure 11:
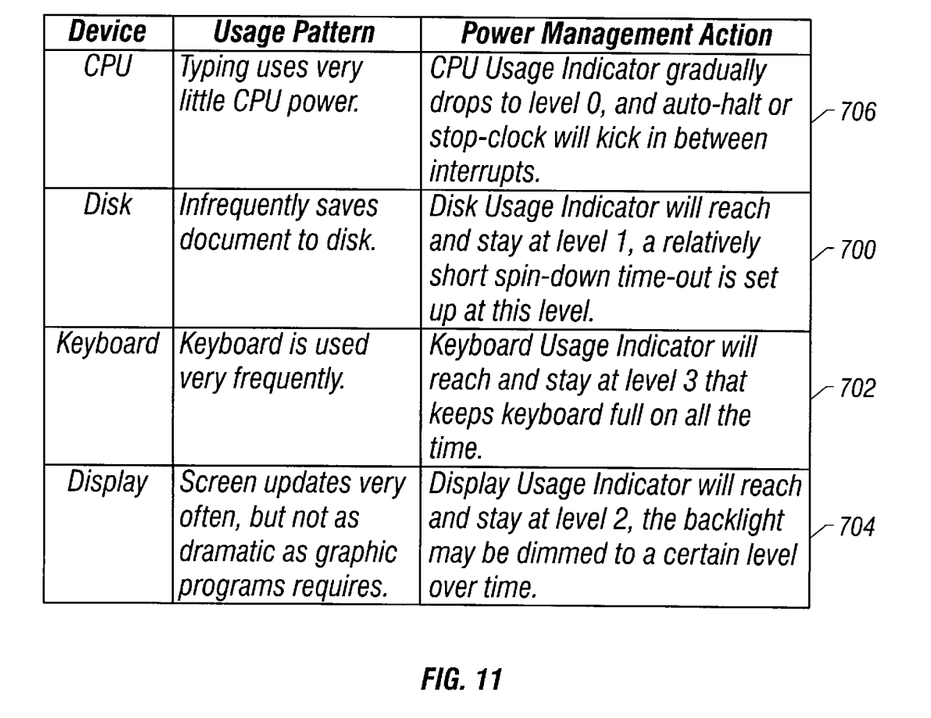
FIGS. 11 and 12 are tables showing examples of power distribution in the system of FIG. 1.

The display will be updated often, but will remain below its maximum usage level (e.g., when using a graphics program). Thus the display will reach the frequently used state, and the monitor will be configured to dim only after a relatively long period of time (row 704). For example, if a liquid crystal display is used (e.g., in a notebook computer), the backlight of the display will be configured to dim after the preset time. If a standard monitor is used, the brightness of the monitor is controlled in a similar fashion.

Last, the CPU is used very little in word processing, so the CPU usage indicator will gradually drop to zero, and between interrupts the CPU will be turned off (row 706).

Whenever the user changes his usage pattern over at least the sampling period, the CPU may reconfigure the power parameters of the devices. For example, if the user stops typing for a long period, the disk will drop to the rarely used level, and will be powered down. Depending on how long the break is, the keyboard may also drop to the rarely used level and shut down, and the display may either dim or shut down completely. The CPU will remain in the lowest, rarely used state. When the user resumes typing, the CPU, disk, keyboard and display will gradually increase their state and be allocated more power.

Figure 12:
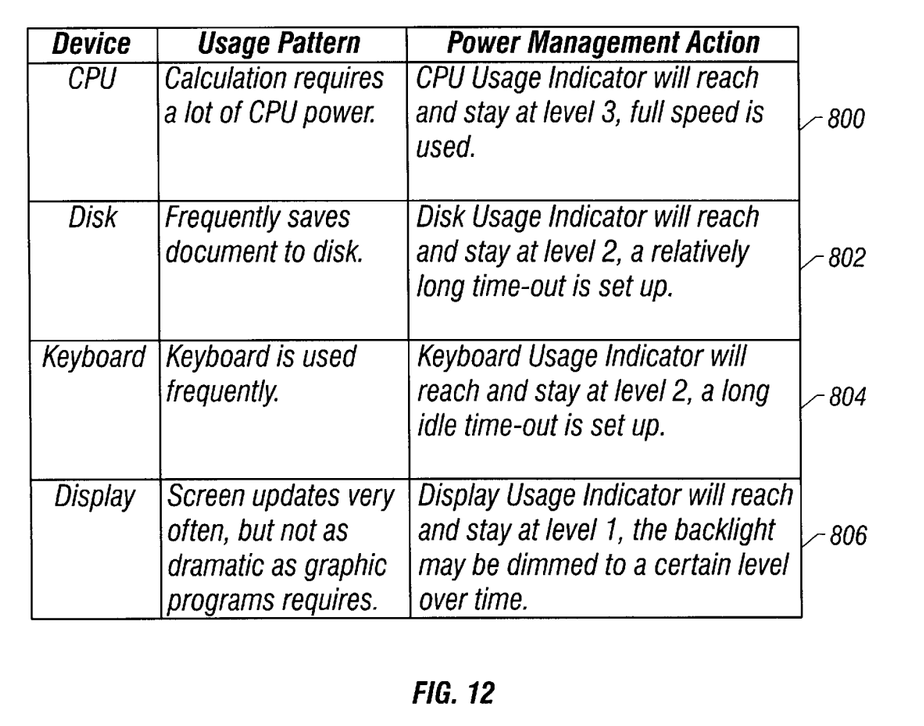

Referring to FIG. 12, in another example, the user employs the system to work on a spreadsheet. Because calculation requires much CPU power, the CPU will reach and remain at the constantly used state, and will be configured to function at full speed (row 800). The disk drive will reach and remain at the frequently used state, because the user will typically be saving his document to disk often (row 802). Because the keyboard is used frequently, the keyboard will also reach and stay at the frequently used state, and the CPU will allocate it a long idle time-out period (row 804). The display updates often, but still less than in graphic programs, so that the display will reach and remain at the infrequently used state, in which it is dimmed over a relatively short time (row 806).

When dynamic power management is not desired, the feature is disabled by, for example, disabling the timer.

Other embodiments are within the scope of the following claims. For example, more or fewer than four usage level indicators can be assigned to each device. The sampling period may be changed from five minutes to any other time. Alternatively, the system can be configured to have a different sampling time for different devices. For example, if a device is at level 0, its counter will be read every ten minutes; at level 1, every five minutes; at level 2, every 2 minutes; and at level 3, every minute. In addition, decision algorithms other than that shown in FIG. 8 can be used.

In other embodiments, the power management operations described above are programmed into the higher level operating system of the CPU, instead of being implemented at the firmware level (i.e., in the basic input output system). Because operating systems generally have mechanisms for monitoring which device is being accessed at any one time, power management is performed without the input/output trapping registers.

The rate of use of a device may also be monitored by tracking mouse or keyboard activities that are related to activities performed on the device. For example, display activities are almost always tied to keyboard and mouse activities. This is because a user typically does not watch or update the monitor without using the keyboard or mouse.

In addition, the system regulates power use by devices other than those listed above. These include devices with input/output addresses known to the firmware; devices whose rate of use can be monitored at their input/output ports; devices whose rate of use can be tied to mouse or keyboard activities; and devices with distinguishable power management states.

What is claimed is:

1. A method for managing power usage in a computer system having a power-using device with an assigned range of ports, the method comprising:

monitoring a rate of data communications per unit of time that occur within the assigned range of ports, using a central processing unit to interact with the power-using device, and regulating power use by the device based on the rate.

2. The method of claim 1 wherein the rate of data communications per unit of time is measured periodically.

3. The method of claim 1 further comprising assigning a state indicator to the device based on the rate, and regulating power use based on the indicator.

4. The method of claim 3 wherein regulating power use by the device comprises updating power usage parameters of the device based on the indicator.

5. The method of claim 1 further comprising monitoring a rate of data communications per unit of time that occur with a second power-using device in the computer, and regulating power use by the second device based on rate of data communications per unit of time.

6. The method of claim 1, wherein the device comprises an I/O device.

7. The method of claim 1, wherein the device is selected from a group consisting of a floppy disk drive, a hard disk drive, a display monitor, a keyboard, a mouse an infrared communication device, a modem card, a network chip and an audio chip.

8. The method of claim 1, wherein the regulating does not include changing an operating frequency of the central processing unit.

9. A method for managing power usage in a computer having power-using devices having respectively different assigned port ranges, the method comprising:
    periodically monitoring rates of data communications per unit of time that occur with the port ranges,
    assigning a state indicator to each device based on its monitored rate, and
    regulating power use by each device based on its indicator.

10. A computer program managing power usage in a computer having a power-using device with an assigned range of ports, the computer program comprising:
    instructions that cause the computer to monitor a rate of data communications per unit of time that occur with the assigned range of ports,
    instructions that cause a central processing unit of the computer to interact with the power-using device,
    instructions that cause the computer to maintain stored rate information for the device based on the results of the monitoring, and
    instructions that cause the computer to regulate power use by the device based on the stored rate information.

11. The program of claim 10 wherein the instructions monitor the rate of data communications per unit of time periodically.

12. The program of claim 10 wherein the instructions that maintain stored rate information assign a state indicator to the device based on the results of the monitoring and stores the indicator.

13. The program of claim 10 wherein the instructions monitor a rate of data communications per unit of time that occur with a second power-using device in the computer, and the instructions maintain stored rate information for the second device.

14. The program of claim 10 wherein the instructions are implemented as firmware in the computer.

15. A firmware program for managing power usage in a computer having power-using devices having respectively different assigned range of ports, the program comprising:
    instructions that cause the computer to monitor rates of data communications per unit of time that occur with the assigned ranges of ports,
    instructions that cause the computer to assign a state indicator to each device based on the results of the monitoring and to store the indicators, and
    instructions that cause the computer to regulate power use by each device based on its indicator.

16. Apparatus for managing power usage in a computer, the computer having a central processing unit and a power-using device having an assigned range of ports, the apparatus comprising:
    a counter connected to count the number of data communications that occur with the assigned range of ports, and
    a regulator connected to regulate power use by the device based on a count accumulated by the counter.

17. The apparatus of claim 16, further comprising a range register coupled to the counter, the register specifying the device to the counter.

18. The apparatus of claim 17, wherein the register specifies a range of ports associated with the device to the counter, the counter counting the number of data communications with the device by monitoring signals exchanged over the ports.

19. The apparatus of claim 16 wherein the regulator periodically reads the counter.

20. The apparatus of claim 16 further comprising a second counter counting the number of data communications with a second power-using device.

21. Apparatus for managing power usage in a computer having power-using devices having respectively different assigned port ranges, the apparatus comprising:
    counters connected to count the number of data communications that occur over the assigned port ranges,
    a range register connected to each counter, each different range register assigning a different one of the address ranges to a different one of the counters, and
    a regulator connected to periodically regulate power use by each device based on a count accumulated in its corresponding counter.

22. A computer system comprising:
    a main processor,
    a power-using device coupled by a communication line to the main processor, the device having an assigned range of ports,
    a circuit connected to monitor the rate of data communications per unit of time that occur between the main processor and the assigned range of ports, and
    a regulator connected to regulate power use by the device based on the rate of data communications per unit of time.

23. The system of claim 22 wherein the device is coupled to the processor by a port, and the data communications include signals that are exchanged over the port.

24. The system of claim 22 further including a range register connected to the circuit, the range register assigning the range of ports to the circuit.

25. The system of claim 22, wherein the regulator regulates power use of the device by updating power parameters of the device based on the rate of data communications.

26. The system of claim 22, further comprising a memory connected to the regulator, the regulator regulating power use of the device by executing firmware in the memory.

27. The system of claim 22 further comprising a timer connected to periodically activate the regulator.

28. The computer system of claim 22, wherein the device comprises an I/O device.

29. The computer system of claim 22, wherein the device is selected from a group consisting of a floppy disk drive, a hard disk drive, a display monitor, a keyboard, a mouse an infrared communication device, a modem card, a network chip and an audio chip.

30. A computer system comprising:

a main processor, power-using devices coupled by a communication line to the main processor, each different device having a different assigned range of ports, circuits connected to monitor the rates of data communications per unit of time that occur with the assigned ranges of ports a range register connected to each circuit, each different register assigning one of the ranges to a different one of the circuits, a memory comprising firmware, a regulator connected to update power usage parameters for each device based on its rate of data communications per unit of time by executing the firmware, and a timer connected to periodically activate the regulator.

31. Apparatus for managing power usage in a computer, the apparatus comprising:

registers, each different register assigning a range of ports to each different one of the devices, counters connected to count the number of data communications that occur with power-using devices in the computer, each different counter counting data communications with a different one of the assigned port ranges, and regulators connected to regulate power use by the devices based on the counts accumulated in the counters.

* * * * *